US007269852B2

(12) United States Patent
Uemura et al.

(10) Patent No.: US 7,269,852 B2
(45) Date of Patent: Sep. 11, 2007

(54) AUTHENTICITY OUTPUT METHOD AND ITS APPARATUS, AND PROCESSING PROGRAM

(75) Inventors: Kazuya Uemura, Nagareyama (JP); Eiichi Kamata, Funabashi (JP); Atsushi Kikuta, Kashiwa (JP); Satoe Okayasu, Saitama (JP)

(73) Assignee: Hitachi, Ltd., Tokyo (JP)

( * ) Notice: Subject to any disclaimer, the term of this patent is extended or adjusted under 35 U.S.C. 154(b) by 710 days.

(21) Appl. No.: 10/062,949

(22) Filed: Jan. 30, 2002

(65) Prior Publication Data

US 2002/0103645 A1 Aug. 1, 2002

(30) Foreign Application Priority Data

Jan. 31, 2001 (JP) .............................. 2001-023229

(51) Int. Cl.
*G06F 7/04* (2006.01)
*G06F 21/20* (2006.01)
*G06F 21/22* (2006.01)
*G06F 21/24* (2006.01)

(52) U.S. Cl. ........................................ 726/26; 713/183
(58) Field of Classification Search ................ 713/200; 726/26
See application file for complete search history.

(56) References Cited

U.S. PATENT DOCUMENTS

| 5,935,243 | A  | * | 8/1999  | Hasebe et al. ................ 726/26 |
| 5,960,100 | A  | * | 9/1999  | Hargrove ...................... 382/124 |
| 6,317,783 | B1 | * | 11/2001 | Freishtat et al. ............. 709/218 |
| 6,572,025 | B1 | * | 6/2003  | Nishikado et al. .......... 235/494 |
| 6,647,200 | B1 | * | 11/2003 | Tanaka ......................... 386/46 |
| 6,766,454 | B1 | * | 7/2004  | Riggins ...................... 713/185 |
| 7,100,049 | B2 | * | 8/2006  | Gasparini et al. ........... 713/170 |
| 2001/0025272 | A1 | * | 9/2001 | Mori et al. .................... 705/76 |
| 2002/0059364 | A1 | * | 5/2002 | Coulthard et al. .......... 709/203 |
| 2002/0095579 | A1 | * | 7/2002 | Yoshiura et al. ............ 713/176 |

FOREIGN PATENT DOCUMENTS

| EP | 0883284 A2     | 12/1998 |
| EP | 0936531 A2     | 8/1999  |
| EP | 0982927 A1     | 3/2000  |
| JP | 11-239129      | 8/1999  |
| JP | 2000-287065 A  | 10/2000 |
| JP | 2000-288839 A  | 10/2000 |
| KR | 2000-036707    | 7/2000  |
| WO | WO00/46681 A1  | 8/2000  |

OTHER PUBLICATIONS

Jim Youll "Froud Vulnerabilities in SiteKey Security at bank of america" Jul. 18, 2006, pp. 1-15.*
Yoshiura et al. "INTERNET-MARKs: Clear, Secure, and Portable Visual Marks for the Cyber Worlds." Proceedings of the 7th International Workshop on Security Protocols, pp. 195-207 (May 2000).

* cited by examiner

*Primary Examiner*—Nasser Moazzami
*Assistant Examiner*—Eleni A. Shiferaw
(74) *Attorney, Agent, or Firm*—Townsend and Townsend and Crew LLP

(57) ABSTRACT

Authenticity output method and apparatus for outputting a verification result of authenticity based on digital data. An authenticity output method constructed by the steps of: registering information which is outputted together with the verification result of the authenticity based on the digital data into a personal table for verification; verifying the authenticity based on the digital data; and when the verification result of the authenticity based on the digital data is outputted, reading out the information registered in the personal table for verification and outputting it in accordance with the verification result. An apparatus for realizing those functions.

12 Claims, 12 Drawing Sheets

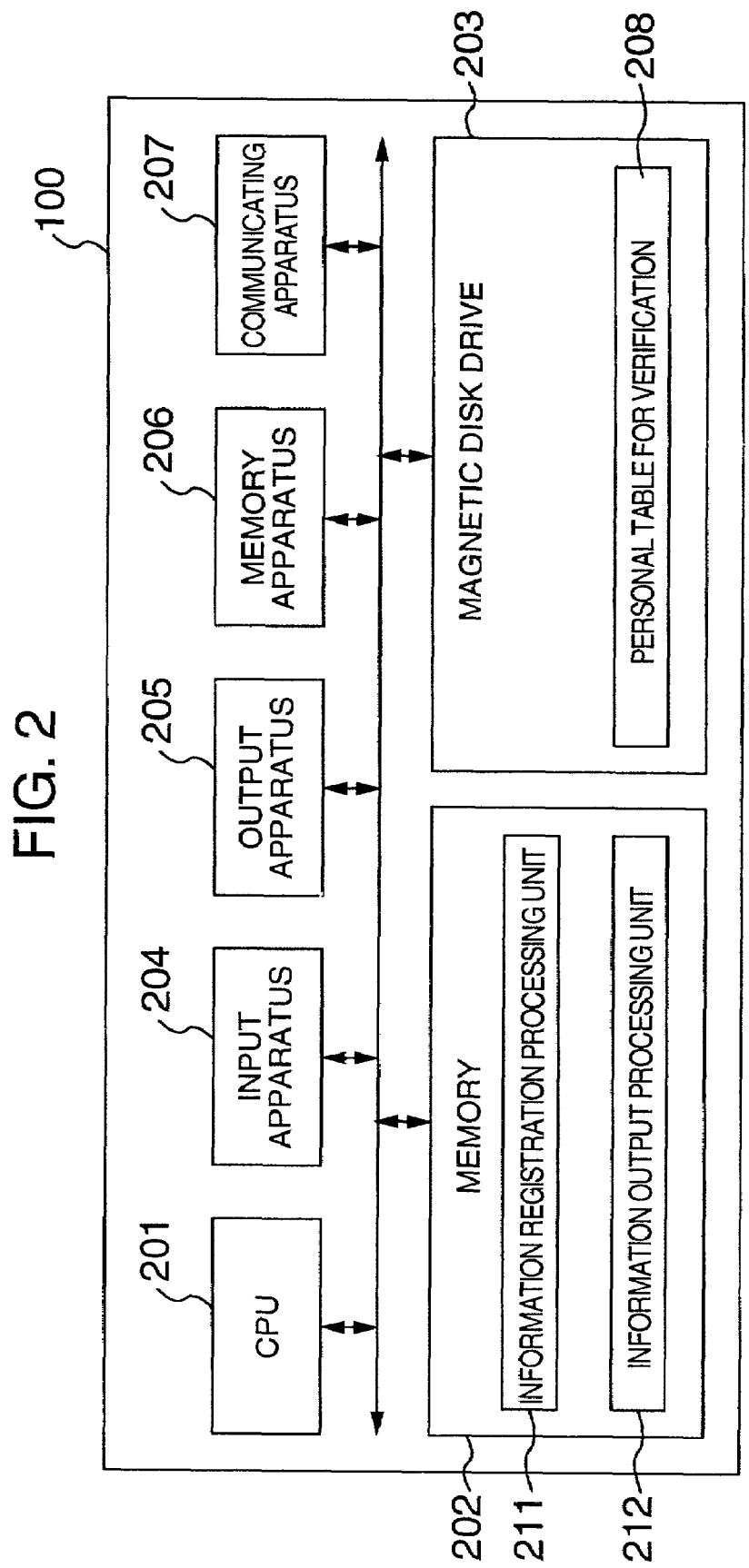

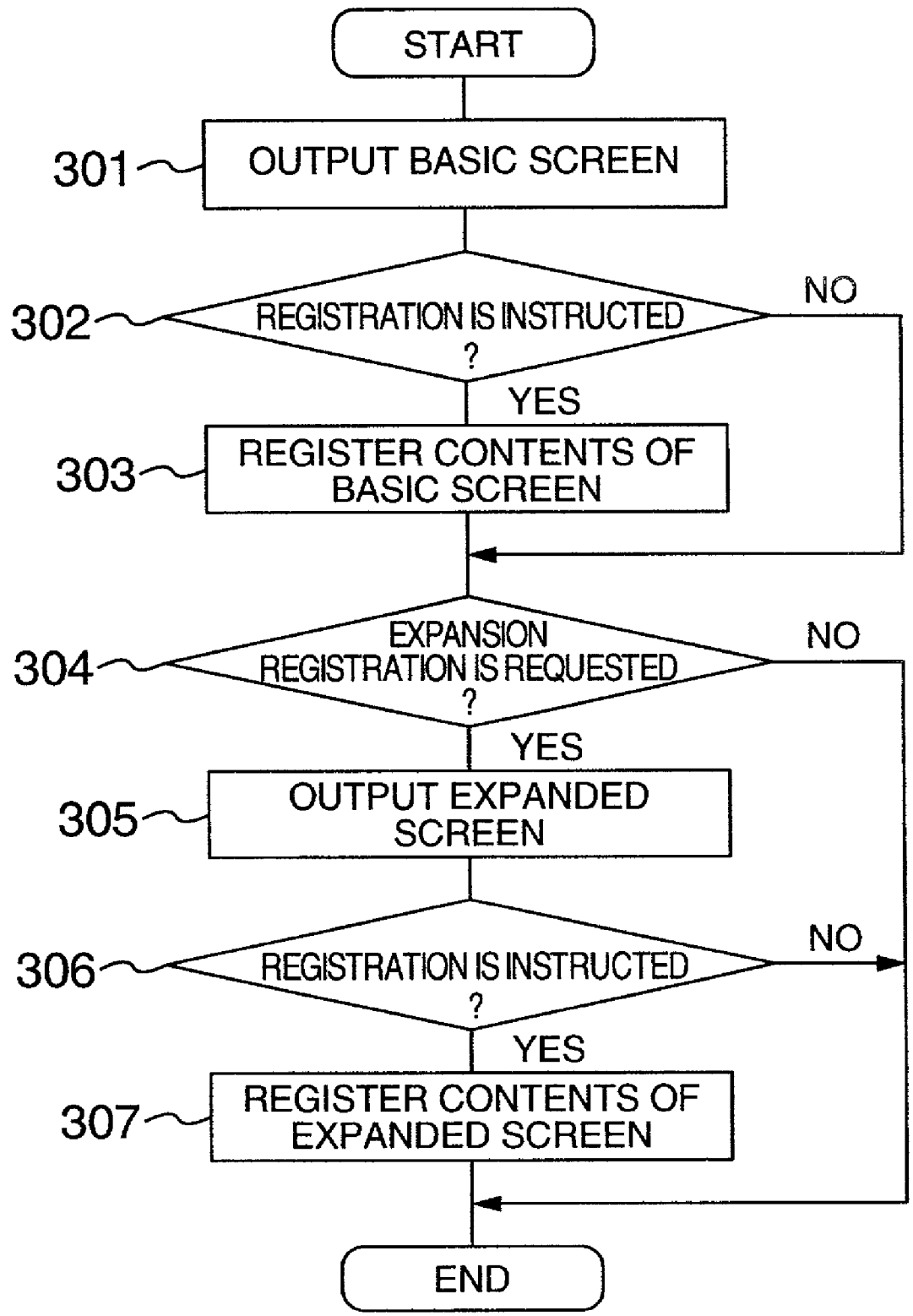

FIG. 4

TABLE SETTING : c:¥im.im

REGISTRATION INFORMATION : @UEMURA

FIG. 5

TABLE SETTING : c:¥im.im

REGISTRATION INFORMATION : @UEMURA

AUDIO OUTPUT OF REGISTRATION INFORMATION ◯ YES ● NO

ENCRYPTION OF REGISTRATION INFORMATION ◯ YES ● NO

SIGNATURE OF REGISTRATION INFORMATION ◯ YES ● NO

FIG. 6

CHECK THE POSITION FOR DISPLAYING THE INFORMATION INPUTTED BY THE PREVIOUS SCREEN

☐ DISPLAY AT RANDOM

FIG. 7A

| TYPE | ENCRYPTION | SIGNATURE | OUTPUT POSITION INFORMATION | REGISTRATION INFORMATION |
|---|---|---|---|---|
| CHARACTERS | NO | NO | x1,y1 | @UEMURA@ |
| IMAGE | NO | NO | x2,y2.NEW WEB PAGE | Ri JFIF ... |
| AUDIO | YES | NO | ----- | aourjaouge(ENCRYPTION) |
| MOTION IMAGE | NO | YES | x3,y3.NEW DIALOG | UEMURA.aoudkre.UEMURA |
| ----- | ----- | ----- | ----- | ----- |

FIG. 7B

| USER ID | TYPE | ENCRYPTION | SIGNATURE | OUTPUT POSITION INFORMATION | REGISTRATION INFORMATION |
|---|---|---|---|---|---|
| user0001 | CHARACTERS | NO | NO | x1,y1 | @UEMURA@ |
| user0002 | IMAGE | NO | NO | x2,y2.NEW WEB PAGE | Ri JFIF ... |
| user0003 | AUDIO | YES | NO |  | aourjaouge(ENCRYPTION) |
| user0004 | MOTION IMAGE | NO | YES | x3,y3.NEW DIALOG | UEMURA.aoudkre.UEMURA |
| ----- | ----- | ----- | ----- | ----- | ----- |

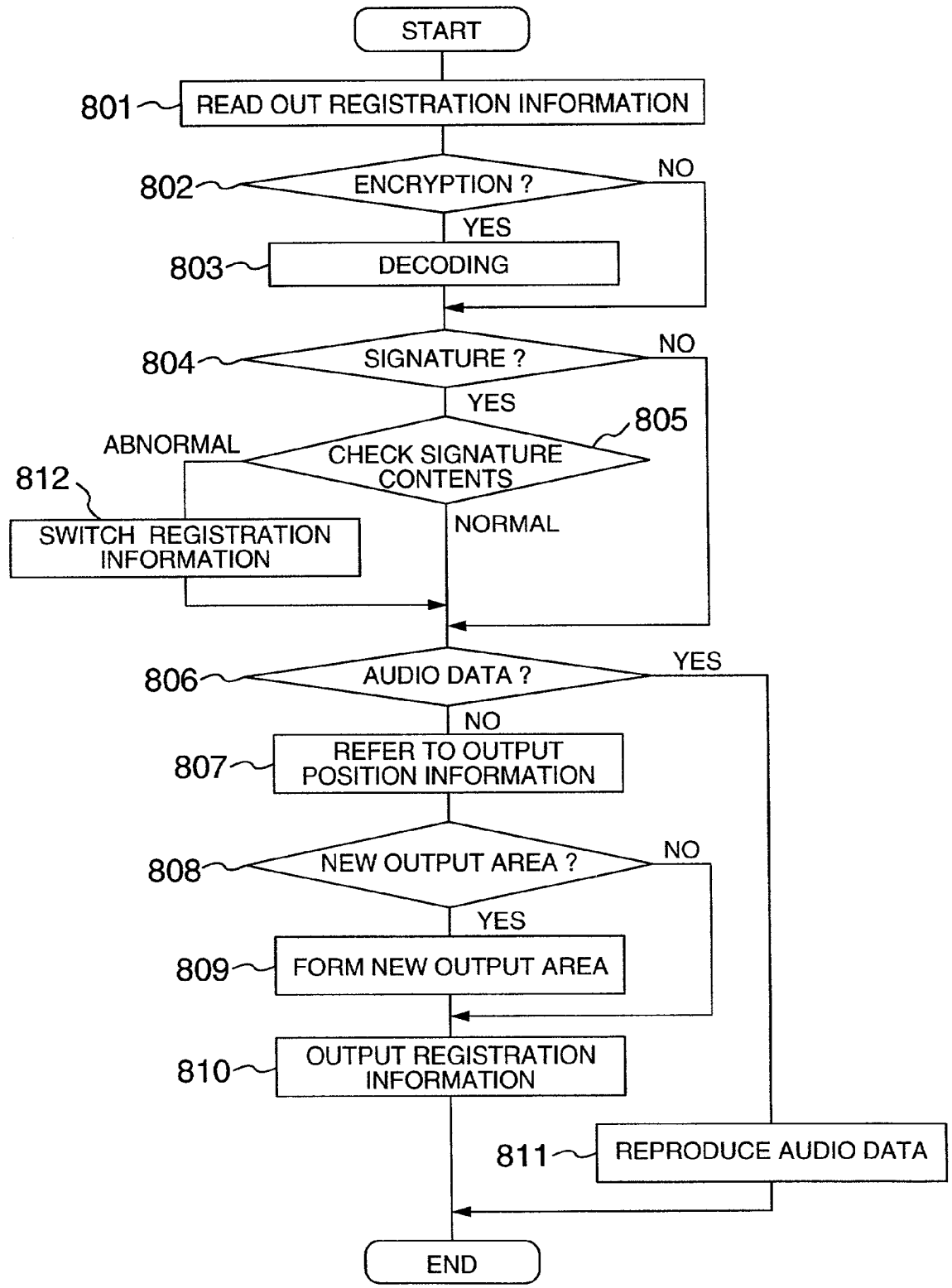

FIG. 12A  FIG. 12B
DISPLAY EXAMPLE OF NEW WEB PAGE
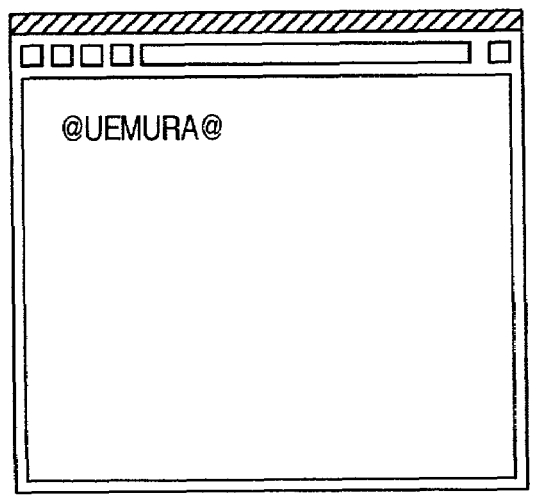
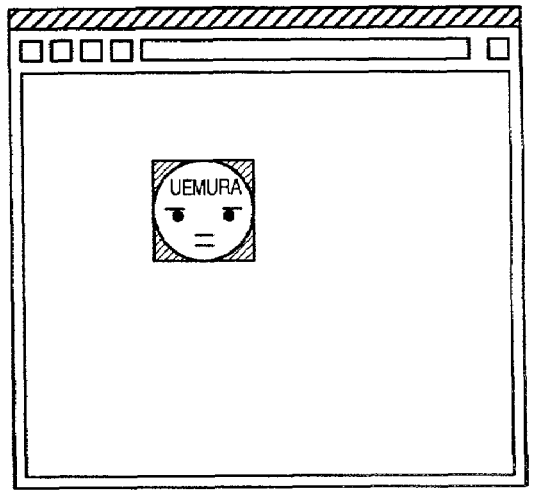
FIG. 12C  FIG. 12D
DISPLAY EXAMPLE OF NEW DIALOG
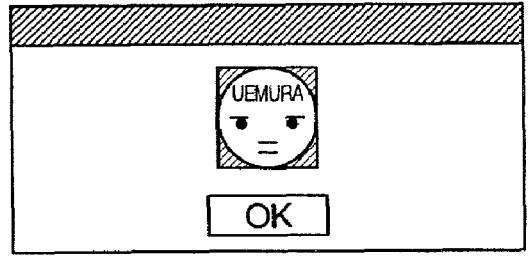

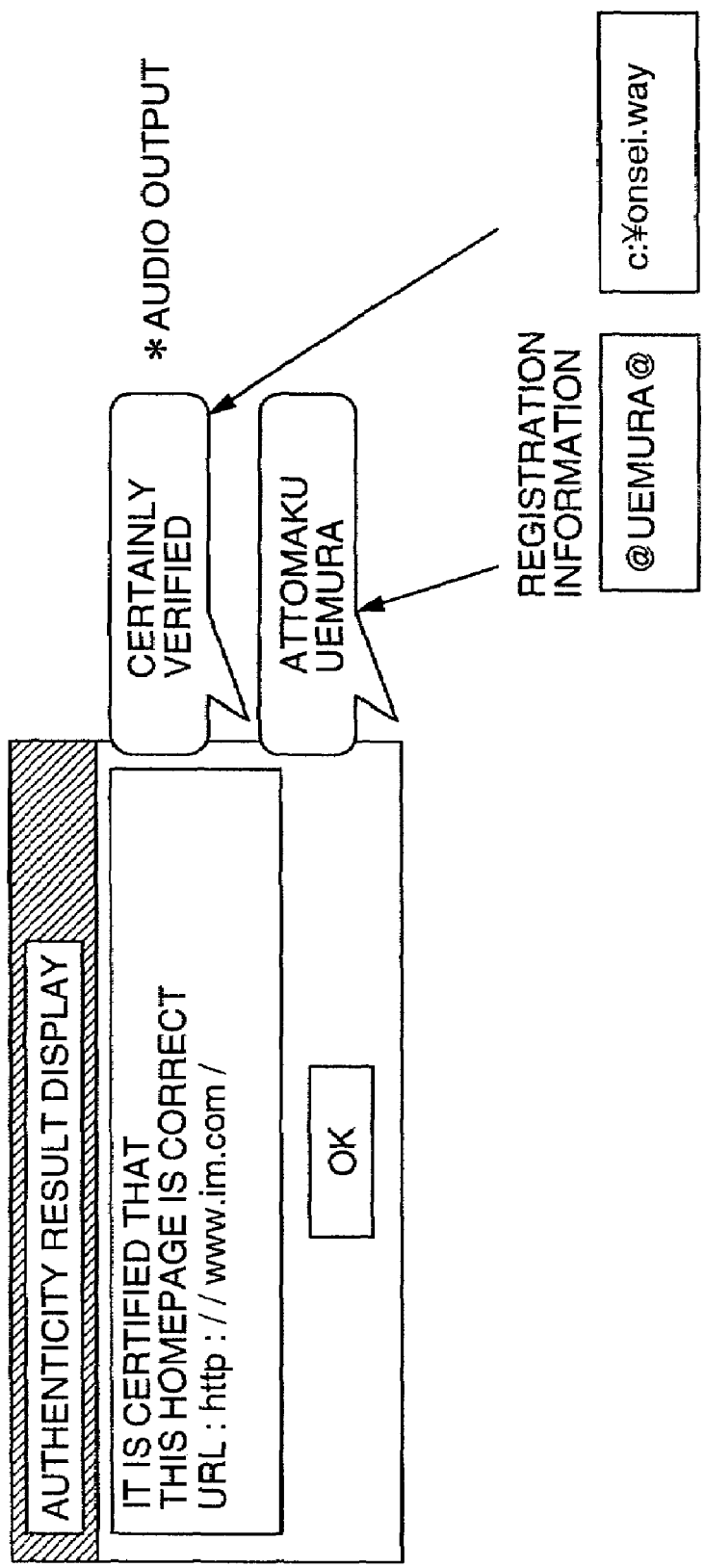

EXAMPLE OF RESULT PAGE
(IN CASE OF OUTPUTTING CHARACTERS)

AUTHENTICITY OUTPUT METHOD AND ITS APPARATUS, AND PROCESSING PROGRAM

BACKGROUND OF THE INVENTION

The invention relates to an authenticity output apparatus for outputting a verification result of authenticity of information and, more particularly, to a technique which is effective when it is applied to an authenticity output apparatus for preventing a false authenticity display by the third party.

In EC (Electronic Commerce) activities or the like on a network, an authenticating technique for authenticating the real existence, person himself, further, a credit, and the like of a transaction partner is extremely important. Although there are encrypting techniques (public key system, secret key system) as a foundation technique for realizing such an authenticating technique, a password or the like is also widely used.

Also in the handling of a homepage or other digital contents, a condition such that it is not altered is necessary and it is necessary to confirm that it is a script. For this purpose, although there is an electronic seal or the like which can confirm the authenticity, a method which is similarly based on the encrypting technique and other various methods are used as foundation techniques.

As a technique which is used in the WEB site, there is a technique for confirming by using marks for confirmation of the authenticity (JP-A-11-239129). In such an example, in order to verify the authenticity of digital data such as page data or the like, mark image data in which authentication information has been embedded as a digital watermark is added to the digital data and an authenticating process is executed by using the authentication information in the marks, thereby enabling whether the digital data has been altered or not to be verified and enabling whether the site has been authenticated as a superior site by a mark issuing institution or not to be verified. In the electronic authentication foundation, means for verifying by using the public key encrypting system has been realized in order to certify the person himself on the Internet.

According to the conventional technique, there is a problem such that when a behavior (dialog display) of an authenticity display which is outputted by a result of a legal authenticating process or a false display which imitates a display of an image change is executed by the third party having an evil intention via an on-line or by sending some program to a client terminal, or by another means, it is difficult to distinguish a display as a result of a legal authenticating process from a display as a result of a false authenticating process.

SUMMARY OF THE INVENTION

It is an object of the invention to solve the above problem and provide a technique which can output a verification result which is hard to be forged by the third party when a verification result of authenticity based on digital data is outputted.

According to the invention, there is provided an authenticity output apparatus for outputting a verification result of authenticity based on digital data such as authentication or the like which is made by using a public key encryption or the like, wherein information registered in a personal table for verification is outputted together with the verification result of the authenticity based on the digital data.

According to the invention, when a program for verifying the authenticity based on the digital data is installed or the like, as arbitrary information known only by the user who verifies the authenticity based on the digital data, arbitrary character train information, image data information, audio data information, or the like is received and registered into a personal table for verification in an information processing apparatus on the client side.

As a result of an access to the digital data such as a homepage or the like on the Internet, if the information for verifying the authenticity based on the digital data is included in the accessed digital data, the verifying process is executed. When a verification result is outputted, the information registered in the personal table for verification is read out and outputted together with the verification result.

Since the third party who intends to illegally make an authenticity display is difficult to preliminarily know what kind of information has been registered in the personal table for verification on the client side, it is difficult to forge the authenticity display and the false authenticity display by the third party can be prevented.

According to the authenticity output apparatus of the invention as mentioned above, since the information registered in the personal table for verification is outputted together with the verification result of the authenticity based on the digital data, when the verification result of the authenticity based on the digital data is outputted, the verification result which is hard to be forged by the third party can be outputted.

BRIEF DESCRIPTION OF THE DRAWINGS

FIG. 2 is a diagram showing a schematic construction of an authenticity output apparatus 100 in the embodiment;

FIG. 3 is a flowchart showing a processing procedure for an information registering process in the embodiment;

FIG. 4 is a diagram showing an example of a basic screen in the embodiment;

FIG. 5 is a diagram showing an example of an expanded screen in the embodiment;

FIG. 6 is a diagram showing an example of a position registration screen in the embodiment;

FIGS. 7A and 7B are diagrams showing examples of a personal table 208 for verification in the embodiment;

FIG. 8 is a flowchart showing a processing procedure for an information output process in the embodiment;

FIGS. 12A to 12D are diagrams showing the fourth example of an output of an authenticity result in the embodiment;

FIG. 14 is a diagram showing the sixth example of an output of an authenticity result in the embodiment;

DESCRIPTION OF THE EMBODIMENTS

An authenticity output apparatus in the embodiment for outputting a verification result of authenticity based on digital data will be described hereinbelow.

Figure 1:
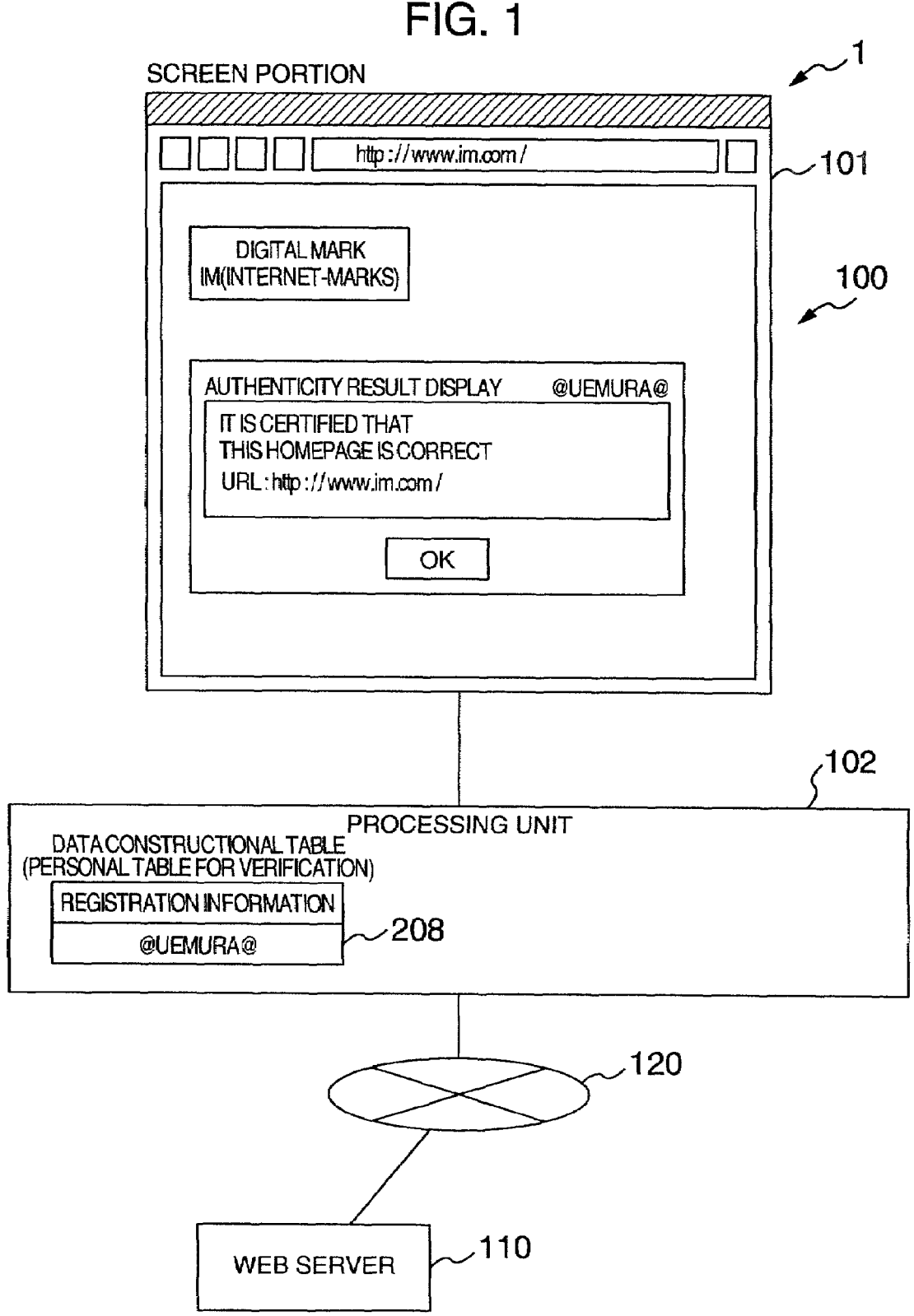
FIG. 1 is a diagram showing an outline of an authenticity output process in the embodiment.

FIG. 1 is a diagram showing an outline of an authenticity output process in the embodiment.

The embodiment is constructed by an authenticity output apparatus 100 provided on the side of a client 1, a server 110, and a network 120 for connecting them.

As shown in FIG. 1, according to the authenticity output apparatus 100 of the embodiment, if digital mark (hereinafter, referred to as IM (Internet-Marks)) have been added to digital data such as a homepage or the like on the Internet, the authenticity based on the digital data is verified in a processing unit 102 by using the IM. When a verification result is outputted to a screen portion 101, information "@uemura@" registered in a personal table 208 for verification in the authenticity output apparatus 100 is read out and outputted together with the verification result.

FIG. 2 is a diagram showing a schematic construction of the authenticity output apparatus 100 of the embodiment. As shown in FIG. 2, the authenticity output apparatus 100 of the embodiment has a CPU 201, a memory 202, a magnetic disk drive 203, an input apparatus 204, an output apparatus 205, a memory apparatus 206 such as CD-COM, a communicating apparatus 207, and the personal table 208 for verification which are mutually connected by an internal bus.

The CPU 201 is an apparatus for controlling the whole operation of the authenticity output apparatus 100. The memory 202 is a storage device for loading various processing programs for controlling the whole operation of the authenticity output apparatus 100 and data when the operation is controlled.

The magnetic disk drive 203 is a storage device for storing the various processing programs and data as mentioned above. The input apparatus 204 is an apparatus for performing various inputs for verifying the authenticity based on the digital data. The output apparatus 205 is an apparatus which is connected to the screen portion 101 or the like in FIG. 1 and is used for performing various outputs in association with the verification of the authenticity based on the digital data.

The Memory apparatus 206 is an apparatus for reading out contents in a CD-ROM in which the various processing programs mentioned above have been recorded. The communicating apparatus 207 is an apparatus for making communication with a Web server via the network such as Internet, Intranet, or the like. The personal table 208 for verification is a table for registering the information which is outputted together with the verification result of the authenticity based on the digital data.

The authenticity output apparatus 100 has an information registration processing unit 211 and an information output processing unit 212 which are realized by the processing programs in the memory 202.

The information registration processing unit 211 is a processing unit for registering the information which is outputted together with the verification result of the authenticity based on the digital data into the personal table 208 for verification. The information output processing unit 212 is a processing unit for reading out the information registered in the personal table 208 for verification and outputting it together with the verification result when the verification result of the authenticity based on the digital data is outputted.

It is assumed that the programs for allowing the authenticity output apparatus 100 to function as an information registration processing unit 211 and an information output processing unit 212 are recorded into a recording medium such as a CD-ROM or the like and stored into a magnetic disk or the like and, thereafter, they are loaded into the memory and executed. As a recording medium for recording the programs, any recording medium other than the CD-ROM can be used. The programs can be also installed from the recording medium to the information processing apparatus and used. It is also possible to access the recording medium via the network and use the programs.

In the authenticity output apparatus 100 in the embodiment, a process for preliminarily registering the information which is outputted together with the verification result of the authenticity based on the digital data into the personal table 208 for verification will be described hereinbelow. In the authenticity output apparatus 100 in the embodiment, when predetermined conditions are satisfied such as in a case where the program for verifying the authenticity based on the digital data is installed via the network or from an FD or the like, the information registration processing unit 211 is activated, thereby registering the information which is outputted together with the verification result of the authenticity into the personal table 208 for verification. In cases other than the installation, it is also possible to enable an edition and registration in the personal table 208 for verification by always displaying an I/F screen similar to those which will be explained hereinbelow.

FIG. 3 is a flowchart showing a processing procedure for an information registering process in the embodiment. As shown in FIG. 3, the information registration processing unit 211 of the authenticity output apparatus 100 in the embodiment executes the process for registering the information which is outputted together with the verification result of the authenticity based on the digital data into the personal table 208 for verification.

In step 301, the information registration processing unit 211 of the authenticity output apparatus 100 outputs a basic screen for registering the information which is outputted together with the verification result of the authenticity based on the digital data to the output apparatus 205 and receives an input from the user.

FIG. 4 is a diagram showing an example of a basic screen in the embodiment. As shown in FIG. 4, an item "table setting" for setting a name of a file for storing the personal table 208 for verification and an item "registration information" for inputting information which is registered into the personal table 208 for verification are displayed on the basic screen in the embodiment.

The personal table 208 for verification can be also stored in a registry. The registration information is not limited to arbitrary character train information as shown in FIG. 4 but arbitrary alphanumeric information, image data information, audio data information, motion image data information, finger language data information, or IM data information for dialog can be used, or information obtained by combining them can be also inputted. Although the information itself which is registered is inputted into the item "registration information" on the basic screen in the above example, other information such as a file name indicative of an existing location of such information, or the like can be also inputted. The IM data information for dialog is data information for displaying an image obtained by synthesizing character information embedded in the IM in the case where the digital data is not altered.

In step 302, whether the registration according to the contents inputted onto the basic screen has been instructed by the user or not is discriminated by, for example, a method whereby whether a "REGISTER" button displayed on the screen has been pressed or not is discriminated by a program, or the like. If the registration is instructed, step 303 follows and the data information is registered into the personal table 208 for verification in accordance with the contents inputted onto the basic screen.

In step 304, whether the registration of contents other than the contents registered on the basic screen has been requested by the user or not is discriminated. If the registration of a screen other than the basic screen has been requested, step 305 follows.

In step 305, an expanded screen for making the registration other than the contents registered on the basic screen is outputted to the output apparatus 205 and an input from the user is received.

FIG. 5 is a diagram showing an example of an expanded screen in the embodiment. As shown in FIG. 5, check boxes for selecting whether an audio output, encryption, or signature of the registration information is made or not are displayed on the expanded screen in the embodiment. It is assumed that if the encryption or signature is selected, an encryption key which is used in the encryption or digital signature is designated. An I/F which can input a plurality of various information without limiting to one character train can be also displayed in the item of the registration information. In addition to the expanded screen as shown in FIG. 5, it is also possible to output a position registration screen for registering an output position of the registration information to the output apparatus 205 and register the output position.

FIG. 6 is a diagram showing an example of a position registration screen in the embodiment. On the position registration screen in FIG. 6, a registration screen of the output position in case of outputting the registration information to the dialog is shown. It is also possible to register a mode such that when the output position is registered, a new output area such as new Web page, new dialog, or the like is formed and outputted.

In step 306, whether the registration according to the contents inputted to the expanded screen has been instructed by the user or not is discriminated. If the registration is instructed, step 307 follows and the contents inputted to the expanded screen are stored into the personal table 208 for verification. In case of making the verification of the authenticity based on the digital data by the information such as IM, public key certificate, or the like, specific information such as IM issuing institution name, authentication department name, and the like, that is, specific information in the IM or public key certificate designated by the user can be also registered into the personal table 208 for verification as information which is outputted together with the verification result of the authenticity based on the digital data.

FIG. 7A is a diagram showing an example of the personal table 208 for verification in the embodiment. As shown in FIG. 7A, a type of registration information, yes/no of the encryption, yes/no of the signature, the output position information, and the registration information have been stored in the personal table 208 for verification in the embodiment. The data "OuemuraO, aoudkre, xuemurax" of the registration information of the signature "yes" in FIG. 7A indicates "original information, signature data, information upon illegality", respectively.

Explanation will be made hereinbelow with respect to the processes such that, in the authenticity output apparatus 100 of the embodiment, when the authenticity based on the digital data is verified by the IM or the like added to the digital data and the verification result is outputted, the information which has previously been registered in the personal table 208 for verification is read out and outputted together with the verification result. In the authenticity output apparatus 100 of the embodiment, the program for verifying the authenticity based on the digital data is executed and, when the verification result is obtained, the information output processing unit 212 is activated and the information registered in the personal table 208 for verification is read out and outputted together with the verification result.

FIG. 8 is a flowchart showing a processing procedure for an information output process in the embodiment. As shown in FIG. 8, when the verification result of the authenticity based on the digital data is outputted, the information output processing unit 212 of the authenticity output apparatus 100 executes the processes for reading out the information registered in the personal table 208 for verification and outputting it together with the verification result.

In step 801, the information output processing unit 212 of the authenticity output apparatus 100 reads out the registration information in the personal table 208 for verification with reference to the file of the file name set by the table setting on the basic screen. It is assumed that if it is set by the table setting on the basic screen that the personal table 208 for verification is stored into the registry, the registration information is read out from the personal table 208 for verification in the registry.

In step 802, whether the encryption has been made to the read-out registration information or not is discriminated. If it has been encrypted, a decoding is performed in step 803.

In step 804, whether the digital signature has been made to the read-out registration information or not is discriminated. If the digital signature has been made, contents of the signature are checked in step 805, thereby confirming whether the read-out registration information has been altered or not. Such a verification of the authenticity of the digital data is executed by a program for displaying or verifying IM. If it can be confirmed that the registration information is not altered, step 806 follows. If NO, step 812 follows.

In step 806, whether the type of read-out registration information is audio data information or not is discriminated. In case of the audio data information, step 811 follows and the audio data is reproduced.

In step 807, coordinates showing the output position and information indicative of the presence or absence of the formation of a new output area are read out with reference to the output position information of the read-out registration information. In step 808, whether a mode for forming and outputting the new output area such as new Web page, new dialog, or the like has been shown in the read-out output position information or not is discriminated. If the formation of the new output area is shown, step 809 follows and the designated new output area is formed.

In step 810, an output processing program such as image display program, motion image reproducing program, or the like is activated in accordance with the type of registration information, and the read-out registration information is outputted to the output position read out in step 807. If the new output area such as new Web page, new dialog, or the like has been formed in step 809, the read-out registration information is outputted to the output position according the output position information which is in the formed new output area and which was read out in step 807. Upon registration into the personal table 208 for verification, if the specific information such as IM issuing institution name, authentication department name, and the like, that is, the specific information in the IM or public key certificate designated by the user has been registered as information which is outputted together with the verification result of the authenticity based on the digital data, the information such as IM issuing institution name, authentication department name, and the like can be also read out from the IM or the public key certificate and outputted together.

In the flow of FIG. 8, although the user has an impression that only the audio data is independently reproduced, such as other characters or image data can be also processed in parallel together with the audio data.

Figure 9A:
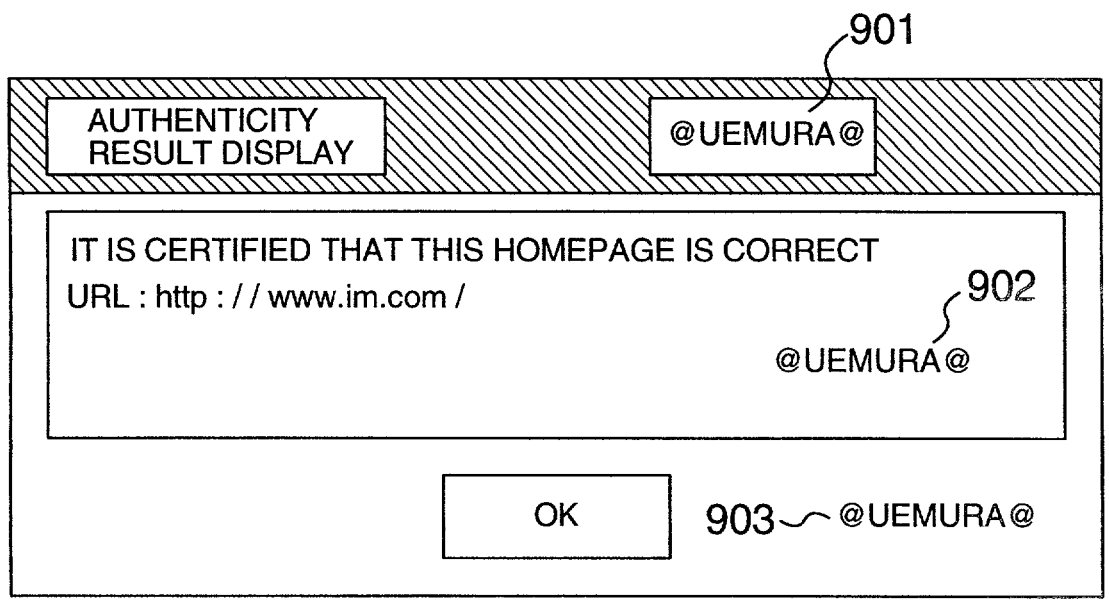
FIGS. 9A and 9B are diagrams showing the first example of an output of an authenticity result in the embodiment.

FIG. 9A is a diagram showing the first example of an output of the authenticity result in the embodiment. In the output example of the authenticity result shown in FIG. 9A, a message "It is certified that this homepage is correct. URL:http://www.im.com/" is displayed as a verification result of the authenticity based on the digital data and the character train information "@uemura@" is displayed to output positions 901 to 903 as information which is outputted together with the verification result of the authenticity based on the digital data.

Figure 9B:
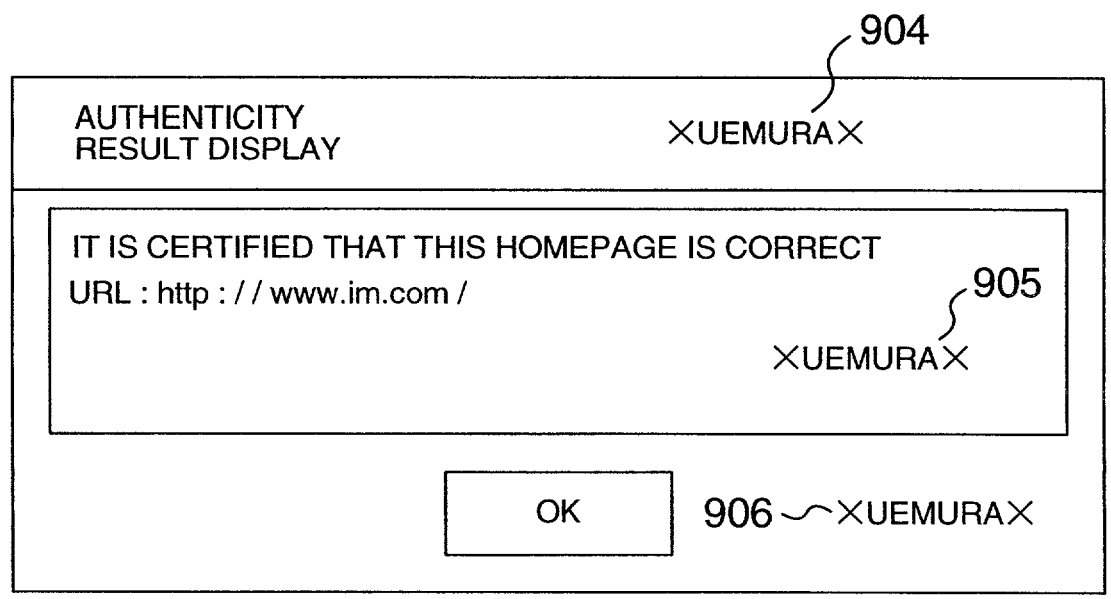

In step 812, as registration information which is actually outputted, it is switched to information which has been set so as to be displayed at the time of illegality such as alteration or the like. For example, if the data "OuemuraO, aoudkre, xuemurax" has been stored in the registration information of the signature "yes" in FIG. 7, as shown in 904 to 906 in FIG. 9B, the information "xuemurax " upon illegality is set to the registration information which is actually outputted. If the information "xuemurax " upon illegality is not stored, fixed information such as "abnormal", "error", or the like which is defined in the program can be also output in place of the registration information. Not only the character train information but also arbitrary alphanumeric information, image data information, audio data information, motion image data information, or the like can be defined as fixed information. It is assumed to be output in place of the registration information in accordance with the type of registration information.

In place of the foregoing embodiments, it is also possible to use a construction such that the server 110 side in FIG. 1 has the authenticity output apparatus 100 shown in FIG. 2 and a construction such that the server 110 is inquired about the authenticity based on the digital data via the online by the client 1.

In case of such an embodiment, the authenticity output apparatus 100 provided for the server 110 executes the information registering process on the basis of the flow of FIG. 3 in a manner similar to the process executed on the client 1 side, and the personal table 208 for verification which is managed by allowing the user ID and the registration information shown as an example in FIG. 7B to correspond to each other is prepared.

Upon registration, the client 1 is allowed to input the registration information via the homepage and this information is stored into the server. The user ID can be inputted by the client or can be also automatically determined by a program such as an ASP or the like.

On the client 1 side, it is sufficient to have a general browser function for displaying data from the network 120 and server 110 side.

Also in this embodiment, it is possible to include a plurality of processors to divide them for servers to transmit electronic data and for server executing authenticity output processing. It is not necessary that server include authenticity output apparatus 100.

Figure 11A:
FIGS. 11A and 11B are diagrams showing the third example of an output of an authenticity result in the embodiment.
Figure 11B:

A more specific embodiment will now be explained with respect to the verifying method using the network 120 as mentioned above. For example, a simple image mark such as a JPEG or the like in which the authenticity marks as shown in FIGS. 11A and 11B have been imaged is added onto the homepage. A link to the server 110 having the authenticity output apparatus 100 for outputting verification result of authenticity based on the digital data is formed on such a mark. When the user of the client 1 clicks such an authenticity mark, the data of link of such as mark ID related to the authenticity mark is sent to the server 110 via the network 120. Together with verification processing of authenticity based on link data, the process according to the information output processing flow in FIG. 8 is executed. The information associated in the table 7B is searched and sent to the client 1 as a character train data of the homepage.

It is also possible to construct in a manner similar to that mentioned above such that real data of the authenticity mark is transmitted to the server 110 via the program which operates on the client 1 side, information embedded as a watermark into the authenticity mark is extracted on the server 110 side, the verification with the information which has previously been managed by the server 110 is made on the basis of the extracted information, and a verification result together with information linked by table 7B can be also transmitted to the client 1 as a data format which can be displayed by a homepage or a dialog.

In addition, transmission by encryption can be utilized for preventing bugging information transmitted to client 1 and leaching registered information.

In any case, it is also possible to use a construction such that when the user of the client 1 clicks the authenticity mark, a dialog box is displayed, the user is allowed to input the ID and transmit it to the server 110, or when accessing the server 110 from the client 1, the user obtains the user ID from the server 110.

Figure 16:
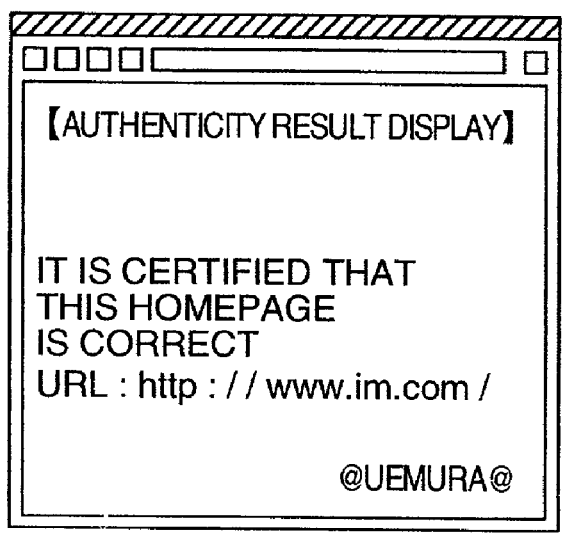
FIG. 16 is a diagram showing an output example of a resultant page.

On the server 110 side, the processes shown in the flow of FIG. 8 and the verifying process are executed and information corresponding to the user ID is added to the client 1 side and displayed in a homepage format as shown in an example in FIG. 16.

Figure 10:
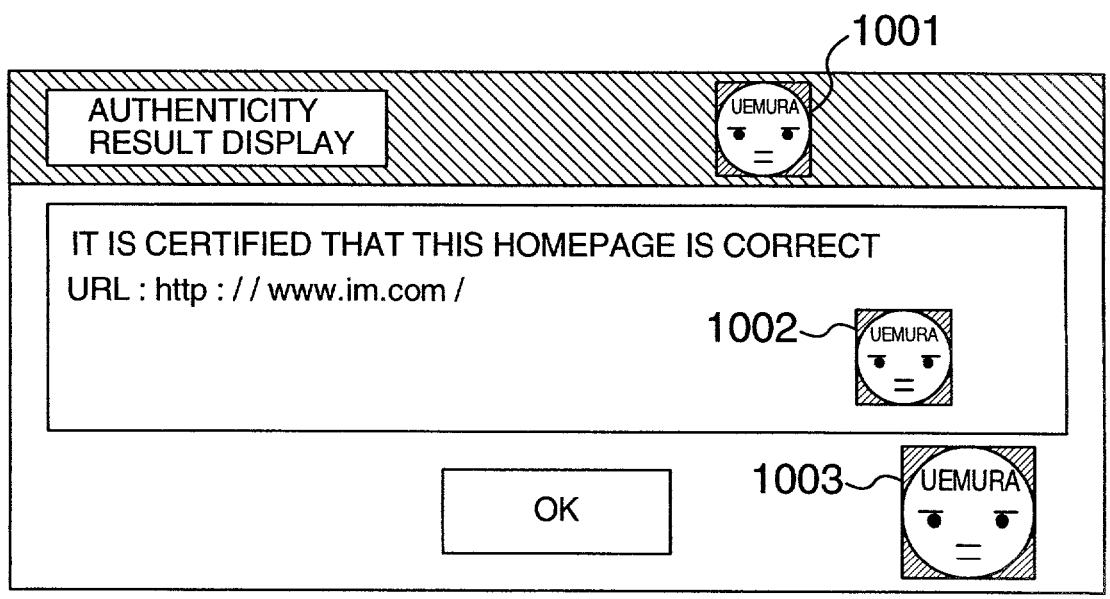
FIG. 10 is a diagram showing the second example of the output of the authenticity result in the embodiment.

FIG. 10 is a diagram showing the second example of the output of the authenticity result in the embodiment. In the output example of the authenticity result shown in FIG. 10, the image data information is displayed to output positions 1001 to 1003 together with a message indicative of the authenticity verification result based on the digital data.

FIGS. 11A and 11B are diagrams showing the third example of an output of an authenticity result in the embodiment. In the output example of the authenticity result shown in FIGS. 11A and 11B, the character train information "@uemura@" and the image data information are displayed to output positions 1101 to 1102 together with the image data of the IM displayed as an authenticity verification result based on the digital data.

FIGS. 12A to 12D are diagrams showing the fourth example of an output of an authenticity result in the embodiment. In the output example of the authenticity result shown in FIGS. 12A to 12D, a new output area such as new Web page, new dialog, or the like is formed and the character train information "@uemura@" and the image data information are displayed.

Figure 13A:
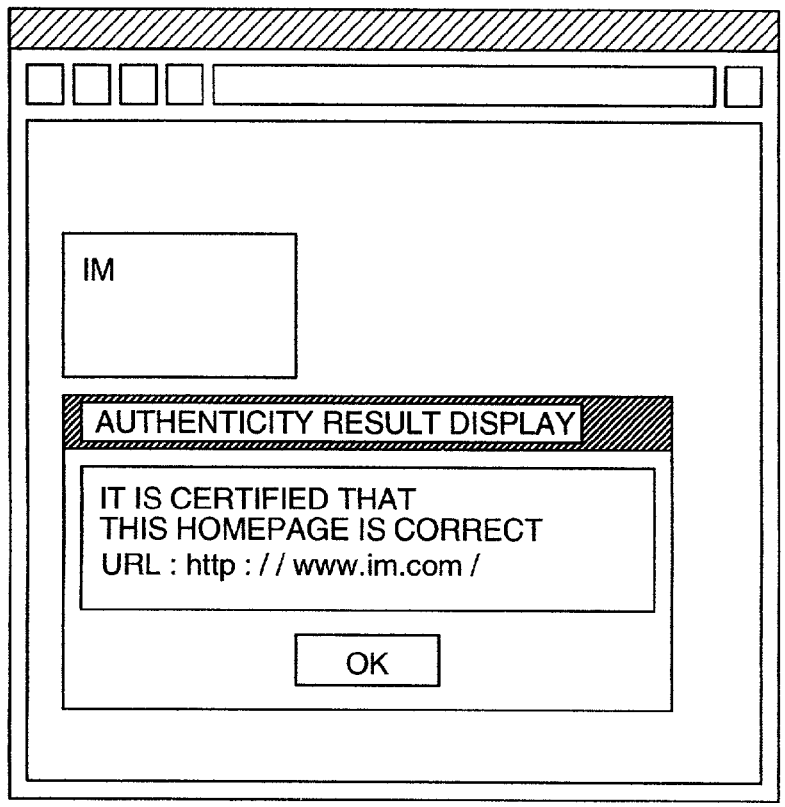
FIGS. 13A and 13B are diagrams showing the fifth example of an output of an authenticity result in the embodiment.
Figure 13B:
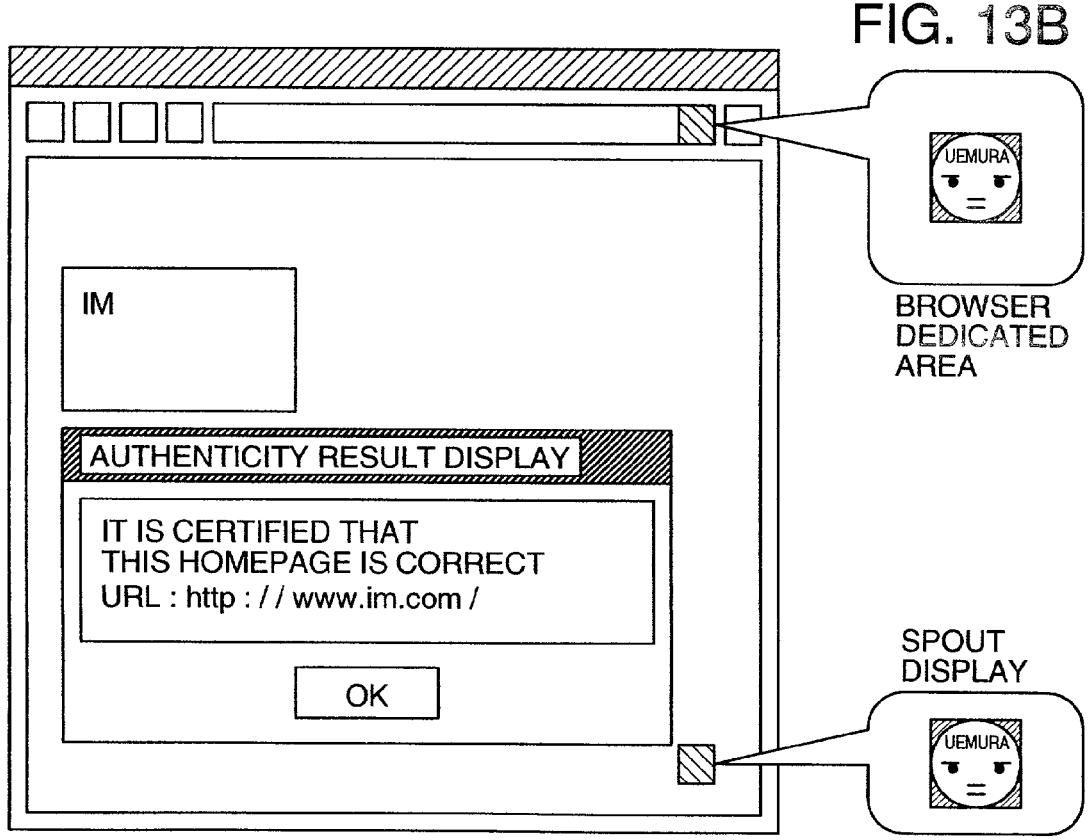

FIGS. 13A and 13B are diagrams showing the fifth example of an output of an authenticity result in the embodiment. In the output example of the authenticity result shown in FIGS. 13A and 13B, the image data information is displayed to a verifying program dedicated area which is displayed only when a normal verifying program makes a verification, a browser dedicated area, and a spouting position.

FIG. 14 is a diagram showing the sixth example of an output of an authenticity result in the embodiment. In the output example of the authenticity result shown in FIG. 14, the audio data information is outputted together with the message indicative of the authenticity verification result based on the digital data.

In the embodiment, the information registered in the personal table 208 for verification can be also outputted into the pull-down menu in order to output the authenticity result by the IM.

Figure 15:
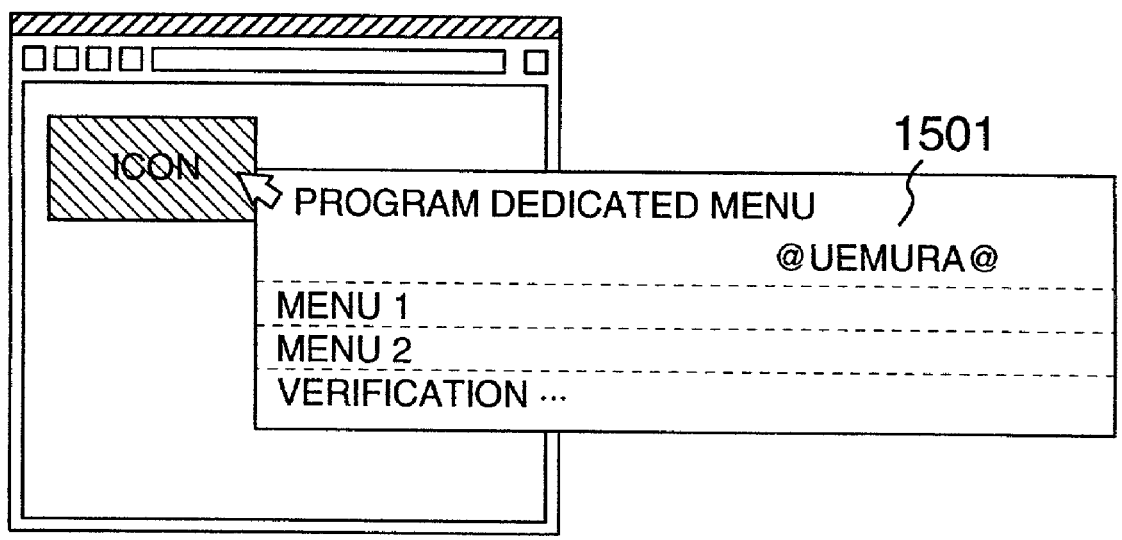
FIG. 15 is a diagram showing an output example in a pull-down menu in the embodiment.

FIG. 15 is a diagram showing an output example in the pull-down menu in the embodiment. In the output example of the pull-down menu shown in FIG. 15, an output example of the character train information "@uemura@" is displayed to an output position 1501 in the pull-down dedicated menu which is displayed when the IM is clicked.

As mentioned above, according to the embodiment, the authenticity based on the digital data is verified by the IM or the like added to the digital data and, when a verification result is outputted, the information which has previously been registered in the personal table 208 for verification is read out and outputted together with the verification result, the user can easily distinguish the true data from the false data by confirming that the contents which have previously been registered in the personal table 208 for verification were outputted.

Since it is difficult that the third party who intends to illegally performs the authenticity display based on the digital data preliminarily knows what kind of information has been registered in the personal table 208 for verification on the client side, it is hard to forge the authenticity display and the false authenticity display by the third party can be prevented.

Although the embodiment has been described above with respect to the case where the IM has been added to the digital data, the invention is not limited to the IM but can be also applied to a case of displaying a result obtained by verifying the public key certificate of a PKI (Public Key Infrastructure) by the verification client. Similarly, the invention can be also applied to any case of the authenticity certification.

It is also possible to use a construction such that the registration information in the personal table 208 for verification and the URL of the information processing apparatuses such as a Web server and the like which need a log-in process are made to correspond to each other, and when a log-in is performed to a specific information processing apparatus, the registration information registered in the personal table 208 for verification is read out and outputted together with a log-in dialog, and information showing to which information processing apparatus the log-in process is performed is presented to the user.

As described above, according to the authenticity output apparatus of the embodiment, since the information registered in the personal table for verification is outputted together with the verification result of the authenticity based on the digital data, when the verification result of the authenticity based on the digital data is outputted, the verification result which is difficult to be forged by the third party can be outputted.

According to the embodiment of the invention, since the information registered in the personal table for verification is outputted together with the verification result of the authenticity based on the digital data, when the verification result of the authenticity based on the digital data is outputted, the verification result which is difficult to be forged by the third party can be outputted.

It will be further understood by those skilled in the art that the foregoing description has been made on embodiments of the invention and that various changes and modifications may be made in the invention without departing from the spirit of the invention and scope of the appended claims.

What is claimed is:

1. An authenticity output method of outputting a verification result of authenticity based on digital data, comprising the steps of:

receiving unique discriminating information to be outputted with a verification result of authenticity based on the digital data, wherein the unique discriminating information is discriminable only by a specific user who inputted the unique discriminating information;

registering the unique discriminating information into a personal table for verification, the personal table for verification associating the registration information inputted by each of a plurality of users with that respective user;

verifying the authenticity based on the digital data;

when the verification result of the authenticity based on the digital data is outputted to one of said users, reading out the unique discriminating information registered in said personal table for verification associated with that user and outputting said unique discriminating information with said verification result on a display screen to that user;

wherein the user is able to verify the unique discriminating information as inputted by the user; and wherein the unique discriminating information is selected from the group consisting of character train information, image data information, audio data information, motion image data information, finger language data information, digital mark data information, and combinations thereof.

2. An authenticity output method of outputting a verification result of authenticity based on digital data, comprising the steps of:

receiving unique discriminating information to be outputted with a verification result of authenticity based on the digital data, wherein the unique discriminating information is discriminable only by a specific user who inputted the unique discriminating information;

registering the received unique discriminating information into a personal table for verification, the personal table for verification associating registration information inputted by each of a plurality of users with that respective user, the personal table further being accessible to a server connected to a network;

receiving a request for verification of the authenticity based on the digital data to said server from a client connected to said network;

in said server, verifying the authenticity based on the digital data;

in said server, reading out the unique discriminating information registered in said personal table for verification and sending said information to said client in accordance with said verification result;

outputting onto a display screen at said client for one of said users the verification result and the unique discriminating information associated with that user which was sent from said server;

wherein the user is able to verify the unique discriminating information as inputted by the user; and wherein the unique discriminating information is selected from the group consisting of character train information, image data information, audio data information, motion image data information, finger language data information, digital mark data information, and combinations thereof.

3. A method according to claim 1 or 2, wherein the unique discriminating information which is outputted together with said verification result is selected to be sensitively recognized.

4. A method according to claim 1 or 2, wherein the registering step includes encrypting the unique discriminating information.

5. A method according to claim 1 or 2, wherein in said step of registering a digital signature is obtained to the unique discriminating information and the obtained digital signature is registered into said personal table for verification.

6. A method according to claim 1 or 2, wherein in said step of outputting when said verification result of the authenticity based on said digital data is outputted, the unique discriminating information registered in said personal table for verification is outputted to the display screen in accordance with display position information registered in said personal table for verification.

7. A method according to claim 1 or 2, wherein in said step of outputting when said verification result of the authenticity based on said digital data is outputted, then outputting the unique discriminating information registered in said personal table for verification to an output area which was newly formed in accordance with display position information registered in said personal table for verification.

8. A method according to claim 1 or 2, wherein in said step of outputting when said verification result of the authenticity based on said digital data is outputted, the unique discriminating information registered in said personal table for verification is outputted together with specific authenticity information in said digital data designated by the user.

9. A method according to claim 1 or 2, wherein in said step of outputting when a display screen for simulating a log-in dialog to a specific information processing apparatus is outputted, the unique discriminating information registered in said personal table for verification is read out and outputted together with said display screen for simulating a log-in dialog.

10. An authenticity output apparatus for outputting a verification result of authenticity based on digital data, comprising:
a receiving unit for receiving unique discriminating information to be outputted with a verification result of authenticity based on the digital data which is discriminable only by a specific user who inputted the unique discriminating information;
an information registration processing unit for registering information which is outputted together with the verification result of the authenticity based on the digital data into a personal table for verification, the personal table for verification associating the registration information inputted by each of a plurality of users with that respective user; and
an information output processing unit for verifying the authenticity based on the digital data, and when the verification result of the authenticity based on said digital data is outputted to one of said users, reading out the unique discriminating information registered in said personal table for verification associated with that user and outputting said unique discriminating information onto a display screen;
wherein the user is able to verify the unique discriminating information as inputted by the user; and
wherein the unique discriminating information is selected from the group consisting of character train information, image data information, audio data information, motion image data information, finger language data information, digital mark data information, and combinations thereof.

11. An authenticity output system for outputting a verification result of authenticity based on digital data through the network, comprising:
a server which is connected to said network and has a receiving unit for receiving unique discriminating information to be outputted with a verification result of authenticity based on the digital data which is discriminable only by a specific user who inputted the unique discriminating information and an information registration processing unit for registering the unique discriminating information which is received by said receiving unit into a personal table for verification, the personal table for verification associating registration information inputted by each of a plurality of users with that respective user, and an information output processing unit for verifying the authenticity based on the digital data, and when the verification result of the authenticity based on said digital data is outputted to one of said users, reading out the unique discriminating information registered in said personal table for verification associated with that user and outputting said information to the network with said verification result; and
a client for requesting from the server the verification of the authenticity based on the digital data and outputting said verified result and said unique discriminating information received from said server through said network onto a display screen,
wherein the user is able to verify the unique discriminating information as inputted by the user; and
wherein the unique discriminating information is selected from the group consisting of character train information, image data information, audio data information, motion image data information, finger language data information, digital mark data information, and combinations thereof.

12. A computer program product embedded in a computer readable medium for allowing a computer to function as an authenticity output apparatus for outputting a verification result of authenticity based on digital data, wherein
said program allows the computer to function as a receiving unit for receiving unique discriminating information to be outputted with a verification result of authenticity based on the digital data which is discriminable only by a specific user who inputted the unique discriminating information registration processing unit for registering the unique discriminating information which is received by said receiving unit into a personal table for verification, the personal table for verification associating the registration information inputted by each of a plurality of users with that respective user, and an information output processing unit for verifying the authenticity based on the digital data, and when said verification result is outputted to one of said users, reading out the unique discriminating information registered in said personal table for verification associated with that user and outputting said unique discriminating information together with said verification result onto a display screen, the user being able to verify the unique discriminating information as inputted by the user; the unique discriminating information being selected from the group consisting of character train information, image data information, audio data information, motion image data information, finger language data information, digital mark data information, and combinations thereof.

* * * * *